US008194065B1

(12) United States Patent
Walker et al.

(10) Patent No.: US 8,194,065 B1
(45) Date of Patent: Jun. 5, 2012

(54) HARDWARE SYSTEM AND METHOD FOR CHANGING A DISPLAY REFRESH RATE

(75) Inventors: James Reed Walker, Santa Clara, CA (US); Charles T. Inman, Redwood City, CA (US); Bruno E. A. Martin, Campbell, CA (US); Ratin Kumar, Santa Clara, CA (US); Manish Lohani, San Jose, CA (US)

(73) Assignee: NVIDIA Corporaton, Santa Clara, CA (US)

( * ) Notice: Subject to any disclaimer, the term of this patent is extended or adjusted under 35 U.S.C. 154(b) by 1009 days.

(21) Appl. No.: 11/943,962

(22) Filed: Nov. 21, 2007

(51) Int. Cl.
*G06F 3/038* (2006.01)
*G09G 5/00* (2006.01)

(52) U.S. Cl. ......... 345/213; 345/501; 345/545; 345/211

(58) Field of Classification Search ........................ None
See application file for complete search history.

(56) References Cited

U.S. PATENT DOCUMENTS 4,434,472 A * 2/1984 Kachun ......................... 345/565
5,166,801 A 11/1992 Yoshikawa
6,049,316 A 4/2000 Nolan et al.
7,023,443 B2 * 4/2006 Yu ................................ 345/539
7,692,642 B2 4/2010 Wyatt
2003/0016215 A1 * 1/2003 Slupe ............................ 345/213
2004/0252115 A1 * 12/2004 Boireau ........................ 345/211
2006/0146056 A1 * 7/2006 Wyatt .......................... 345/501
2007/0279407 A1 * 12/2007 Vasquez et al. ............... 345/213
2008/0291210 A1 * 11/2008 Partani et al. ................. 345/545

OTHER PUBLICATIONS

U.S. Appl. No. 11/943,918, filed Nov. 21, 2007.
U.S. Appl. No. 11/611,805, filed Dec. 15, 2006.
U.S. Appl. No. 11/610,420, filed Dec. 13, 2006.
Cho, "Power Management of iPAQ," USC Information Sciences Institute.
Shah et al., "Enabling Great Battery Life: The Value and the Methods for Laptop Platforms," Intel Developer Forum.
Non-Final Office Action from U.S. Appl. No. 11/943,918, dated Jan. 14, 2011.
Final Office Action from U.S. Appl. No. 11/943,918 dated May 25, 2011.

* cited by examiner

*Primary Examiner* — Daniel Washburn
*Assistant Examiner* — Donna Ricks
(74) *Attorney, Agent, or Firm* — Zilka-Kotab, PC

(57) ABSTRACT

A system and method are provided for changing a display refresh rate. A first register is provided for storing at least one first refresh parameter in association with a first refresh rate. Additionally, a second register is provided for storing at least one second refresh parameter in association with a second refresh rate. Furthermore, logic is in communication with the first register and the second register. Such logic is adopted for selecting the first refresh parameter or the second refresh parameter, for the purpose of reducing artifacts resulting from a change from the first refresh rate and the second refresh rate.

20 Claims, 6 Drawing Sheets

HARDWARE SYSTEM AND METHOD FOR CHANGING A DISPLAY REFRESH RATE

FIELD OF THE INVENTION

The present invention relates to display systems, and more particularly to techniques for refreshing displays.

BACKGROUND

A display refresh rate refers to the number of times an image is re-displayed, or "refreshed" on a display in a given amount of time. A refresh rate is typically expressed in hertz (Hz), thus a refresh rate of 75 means the image is refreshed 75 times in a second, and so on. To date, various systems have been developed for dynamically adjusting a display refresh rate for various purposes.

The aforementioned transition between refresh rates is ideally smooth and/or not significantly noticeable to the user. Unfortunately, however, such refresh rate adjustment is typically carried out by performing a mode switch which requires one to disconnect a graphics head while adjusting raster parameters and clocks, etc. There is thus a need for addressing these and/or other issues associated with the prior art.

SUMMARY

A system and method are provided, for changing a display refresh rate. A first register is provided for storing at least one first refresh parameter in association with a first refresh rate. Additionally, a second register is provided for storing at least one second refresh parameter in association with a second refresh rate. Furthermore, logic is in communication with the first register and the second register. Such logic is adopted for selecting the first refresh parameter or the second refresh parameter, for the purpose of reducing artifacts resulting from a change from the first refresh rate and the second refresh rate.

DETAILED DESCRIPTION

Figure 1:
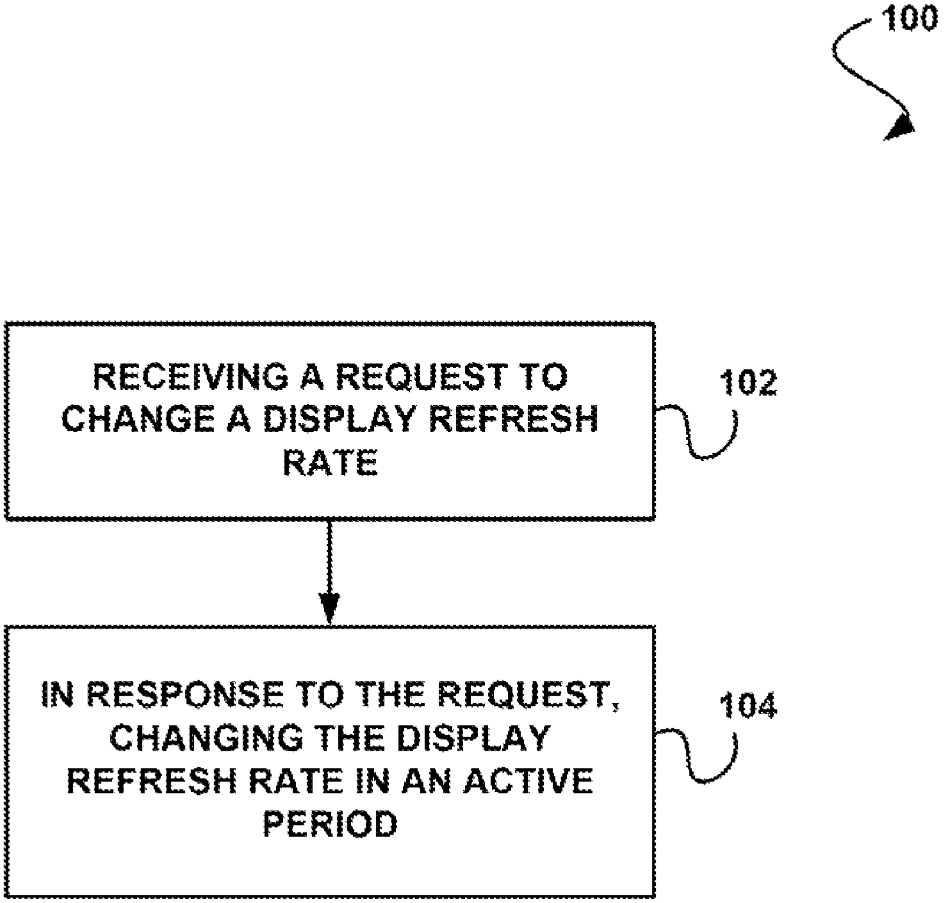
FIG. 1 shows a method for changing a display refresh rate in an active period, in accordance with one embodiment.

FIG. 1 shows a method 100 for changing a display refresh rate in an active period, in accordance with one embodiment. As shown, a request is received to change a display refresh rate. See operation 102.

In various embodiments, the request to change the display refresh rate may be received from different sources utilizing different interfaces. For example, in one embodiment, the request may be received from application software. In another embodiment, the request may be received directly from a user to system hardware. In still another embodiment, the request may be received, from system software via, an application program interface (API).

Further, in response to the request, the display refresh rate is changed in an active period during which pixels are being written to a display device. See operation 104. Strictly as an option, the changing may be carried out utilizing a graphics processor. In one embodiment, the changing may be carried out utilizing a graphics processing unit (GPU) under the control of a driver. In other embodiments, any number of devices may carry out the change in the display refresh rate (e.g. a central processor, etc.).

In the context of the present description, the active period refers to a period during which pixels corresponding to a display device are being driven or supplied with data. In one embodiment the active period may include a vertical active period. In this case, the vertical active period may correspond to an active period, of a frame of data.

Additionally, the active period may include a horizontal active period. In this case, the horizontal active period may correspond to the active period of a line of data, or the period during which a line of pixels corresponding to a display device is being driven or supplied with data.

Of course, such device may include any device capable of driving a display. In various embodiments, the display may include a liquid crystal display (LCD), digital light processing (DLP) display, liquid crystal on silicon (LCOS) display, plasma display, or any other display capable of refresh rate adjustment, for that matter. As an option, the display may even include flat-panel displays of type LVDS (low-voltage differential signaling) or TMDS (transition minimized differential signaling).

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
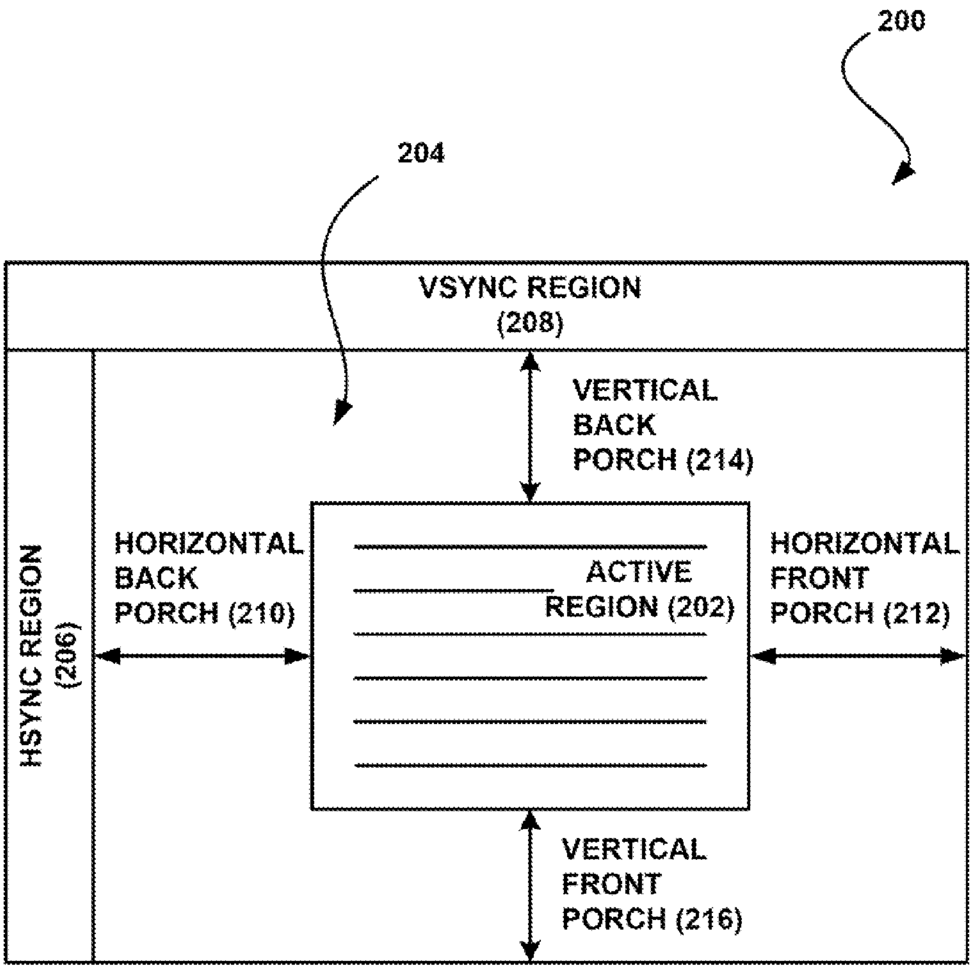
FIG. 2 shows a raster illustrating an active region corresponding to an active period, in accordance with one embodiment.

FIG. 2 shows a raster 200 illustrating an active region corresponding to an active period, in accordance with one embodiment. As an option, the raster 200 may be implemented in the context of the details of the method 100 of FIG. 1. Of course, however, the raster 200 may be implemented in any desired environment. It should be noted that, the aforementioned definitions may equally apply to the description below.

As shown, the raster 200 includes an active region 202, a normal blanking region 204, a horizontal synchronization (HSync) region 206, and a vertical synchronization (VSync) region 208. The normal blanking region 204 includes a horizontal back portion (e.g. horizontal back porch 219), a horizontal front portion (e.g. horizontal front porch 212), a vertical back portion (e.g. vertical back porch 214), and a vertical front portion (e.g. vertical front porch 216).

In one embodiment, an interrupt handler is triggered, at the beginning of every vertical blanking period. In the context of the present description, the vertical blanking period may include a synchronization portion of the vertical blanking period (e.g. the VSync region 208), vertical back porch 214, and/or vertical front porch 216, etc. In another embodiment, an interrupt handler may be triggered, at the beginning of every horizontal blanking period. In this case, the horizontal blanking period may include a synchronization portion of the horizontal blanking period (e.g. the HSync region 206), horizontal back porch 210, and/or horizontal front porch 212, etc.

In operation, a request may be received to change a display refresh rate. When such refresh rate switch is requested, the aforementioned interrupt handler waits until the vertical blanking period and/or the horizontal blanking period ends and the raster 200 enters into the active region 202 of the display, before initiating, the change.

Such active region 202 corresponds to an active period, where the active period refers to a period during which pixels are being written to a display device. During the active period, display timing registers may be updated to represent a new refresh rate. In this way, the raster 200 may be adjusted for reducing or increasing a refresh rate.

Figure 3:
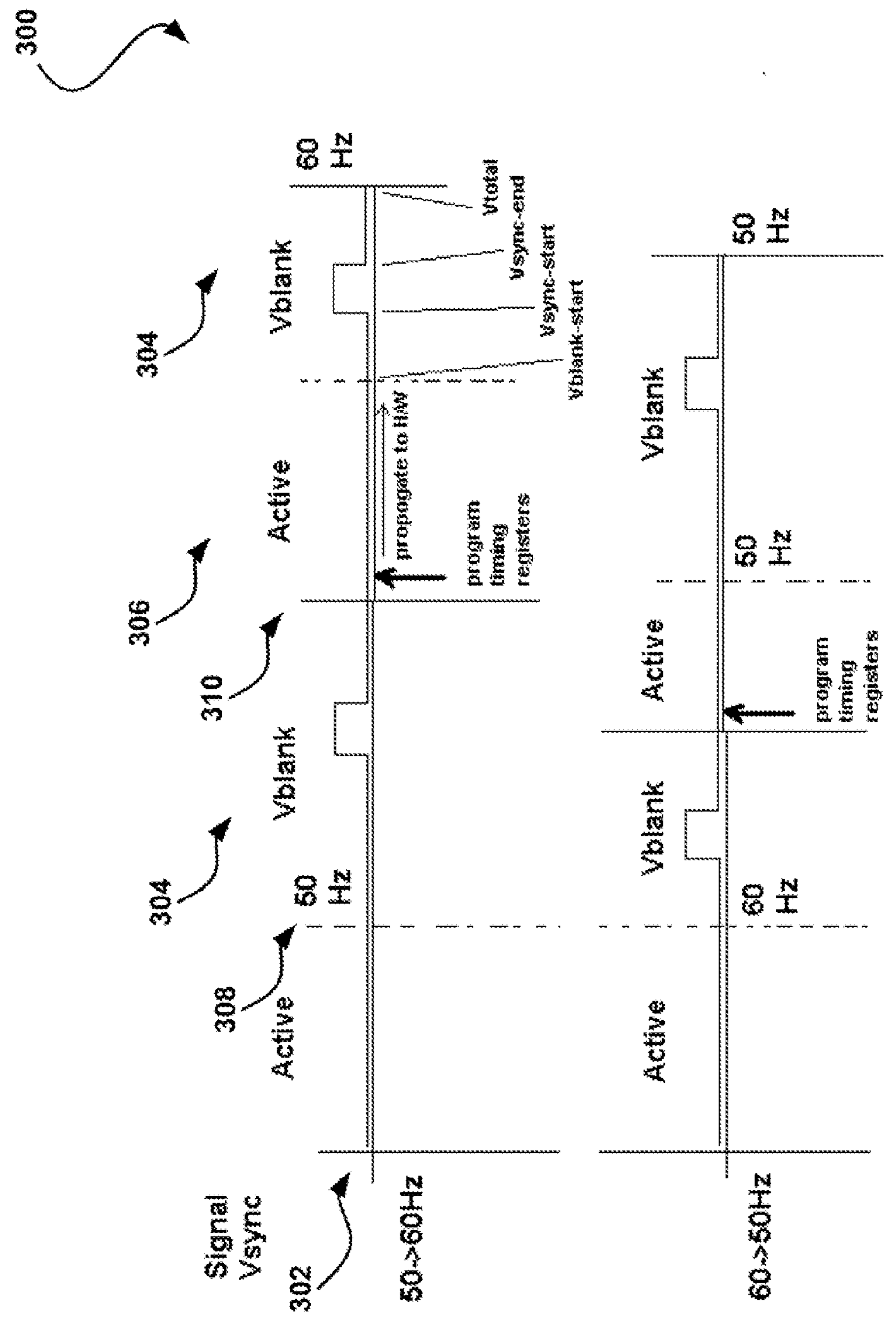
FIG. 3 shows a technique for changing, a display refresh rate in an active period, in accordance with another embodiment.

FIG. 3 shows a technique 300 for changing a display refresh rate in an active period, in accordance with another embodiment. As an option, the present technique 300 may be implemented in the context of the functionality and architecture of FIGS. 1-2. Of course, however, the technique 300 may be carried, out in any desired environment. Again, the aforementioned definitions may apply during the present description.

As shown, a vertical synchronization (VSync) signal 302 is provided. In use, a refresh rate of a display (e.g. a LVDS display) may be changed while continuously rendering graphics to the display. Furthermore, such change may occur without interruption to the rendering of the graphics (i.e. a "glitchless" transition).

in the context of the present description, an interruption refers to any interruption or artifact occurrence in the rendering of the graphics. For example, in various embodiments, such interruption may include a loss of data or a perceived loss of data. In one embodiment, such interruption may be an interruption detectable on the display.

In operation, a request may be received to change a display refresh rate. In one embodiment, this request may be a result of a refresh rate switch being signaled from an application using an API call to a driver. In this case, the driver may be any driver capable of controlling or communicating with a display. As an option the driver may be utilized to control a graphics processor. In one embodiment, such driver may include computer code that constitutes a component thereof.

As shown further in FIG. 3, at the beginning of every vertical blanking period 304, an interrupt handler is triggered. In the context of the present description, a vertical blanking period refers to a time when a raster is within a non-active e.g. a non-viewable) portion of the display, between the last pixel of a first frame and the first pixel of a second sequential frame (i.e. the next frame). Additionally, in the context of the present description, the interrupt handler may include any routine whose execution is triggered by an interrupt or defined event. It should be noted that, in the context of FIG. 3, the pixel clock is assumed to be constant.

Once the request to change a display refresh rate is received, the interrupt handler waits until the vertical blanking period 304 ends and for the raster to enter into an active portion of the display. The period when the raster is in an active portion of the display is illustrated as an active period 306. During this active period 306, display timing registers are updated to represent the new refresh rate.

Updating the timing registers in the active period 306 allows time for the updates to propagate to the timing registers, and subsequently propagate to the display device before the next vertical blanking period. For example, the updates may propagate to the timing registers through a GPU to a display driver or display device controller, and on to the display device. The display device may not sample or employ the new display timing signals during the active period, which makes it the most ideal time to change these signals. In one embodiment, the GPU may include the display device controller. In this case, the GPU may be utilized to update the timing registers. Furthermore, such updating may include updating clocks, interrupt handles, etc., corresponding to the timing registers.

In this way, artifacts may be reduced or eliminated by changing the display refresh rate in the active period during which pixels are being written to a display device corresponding to a display. In various embodiments, such artifacts may include data loss or perceived data loss, interruptions, and/or any other visual artifact. In one embodiment, the artifact may include a visual artifact capable of being viewed on a display.

In various optional embodiments, steps may be skipped in the refresh process that are normally implemented in order to initialize display clocks [e.g., phase-locked loop (PLL) signals, etc.]. Furthermore, steps may be skipped that are normally implemented in order to initialize other properties associated with the display such as pitch, synchronization polarity, scaling and dithering, etc. It should be noted that, although the display refresh rate is shown to be changed from 50 Hz to 60 Hz and from 60 Hz to 50 Hz, any change in the display refresh rate may be implemented.

In one embodiment, a fixed image or fixed frame of data may be displayed, which corresponds to a first display refresh rate. It may then be desired to display video corresponding to a second display refresh rate. A request may be received to change the display refresh rate and, in response to the request, the display refresh rate may be changed in the active period 306 during which the display is being refreshed. It should be noted that, while FIG. 3 is illustrated in the context of a vertical blanking period including the VSync signal 302, such figure may also be viewed in the context of a horizontal blanking period including a HSync signal.

As an option, it may be determined whether the display is currently operating in the active period. In this case, the display refresh rate may be conditionally changed based on the determination. In one embodiment, the display refresh rate may be changed, if it is determined that the display is operating, in the active period. In this case, when the display is operating in the active period, a raster associated with the display is active.

In another embodiment, the changing of the display refresh rate may be delayed, if it is determined that the display is not operating in the active period. On the other hand, the changing of the display refresh rate ma not necessarily be delayed, if it is determined that the display is operating in the active period. In various embodiments, such determination may involve different criteria.

As an option, determining whether the display is operating in the active period may include identifying, a current line, count associated with the refresh of the display. In the context of the present description, a line count refers to a count corresponding to the number of lines of data written as part of the display frame. For example, each time a line of data is read from a register, the line count may increment hone. In this case, the current line count refers to a line of data in a register that is currently being written to a display device. Such register may include any module capable of storing data.

Additionally, determining whether the display is operating in the active period may further include a comparison involving the current line count, and either a start line 308 at which an inactive, period begins or an end line 310 at which the inactive period ends. For example, the start line 308 which an inactive period begins may correspond to a point in a timing register where data is no longer hung output to a display or display driver. In this case, the end line 319 at which the inactive period ends may correspond to the end of the inactive period or the beginning of the active period.

For example, a line count may be incremented, from zero to a number of total lines in a frame of data (n) as part of an active period. Once the line count is equal to n, the frame of data has been read and an inactive period may be recognized. This inactive period may continue until the line count reaches an end of the inactive period (m). At this time, the line count may reset and an active period corresponding to the next frame of data may begin.

Figure 4:
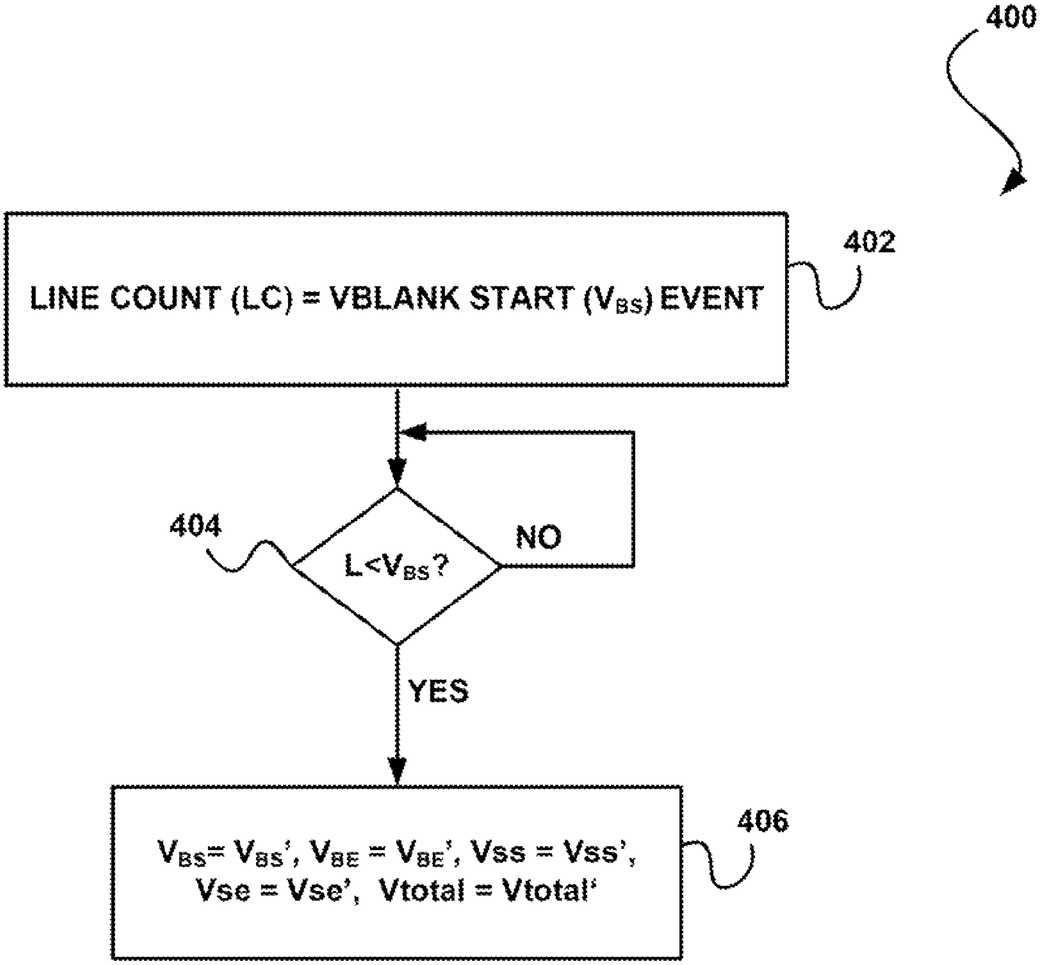
FIG. 4 shows a method for changing a display refresh rate in an active period, in accordance with another embodiment.

FIG. 4 shows a method 400 for changing a display refresh rate in an active period, in accordance with another embodiment. As an option, the present method 400 may be implemented in the context of the functionality and architecture of FIGS. 1-3. Of course, however, the method 400 may be carried out in any desired environment. It should also be noted that the aforementioned definitions may apply during the present description.

As shown, an event is detected where a line count is equal to a vertical blanking period start ($V_{BS}$). See operation 402. In this case, the vertical blanking period start refers to a point where an inactive period associated with a refresh operation begins. This start of the inactive period may likewise correspond to an end of an active period.

As shown further, a line count is then compared with a vertical blanking period start to determine whether the line count is less than the vertical blanking period start. See operation 404. In this case, if it is determined that the line count is less than the vertical blanking period start, the line count will be recognized as corresponding to an active period.

Thus, the vertical blanking period start value is set to a new vertical blanking period start value and a vertical blanking period end value is set to a new vertical blanking period end value. Additionally, the vertical syncing period start value and vertical syncing end value are set to values consistent with the new refresh rate. See operation 406. As an option, the horizontal blanking period, horizontal syncing period, and total horizontal blanking period may also be set to values consistent with the new refresh rate.

In this way, the refresh rate of a display may be changed during the active period. If it is determined that the line count is not less than the vertical blanking period start, the line count will be recognized as corresponding to an inactive period. Thus, it may be determined to delay updating the refresh rate until the line count corresponds to the active period.

In another embodiment, the line count may be compared with the vertical blanking period end value in addition to, or in place of, the vertical blanking period start value. Furthermore, in one embodiment, the current line count may be compared with a threshold. In this case, the comparison may involve the threshold, a difference between the current line count and a start line at which an inactive period begins (i.e. the vertical blanking period start value).

As an option, the threshold may be dependent on a timing of the display. For example, the threshold may be a function of a register read speed. Additionally, the threshold may be a function of a register write, speed.

Figure 5:
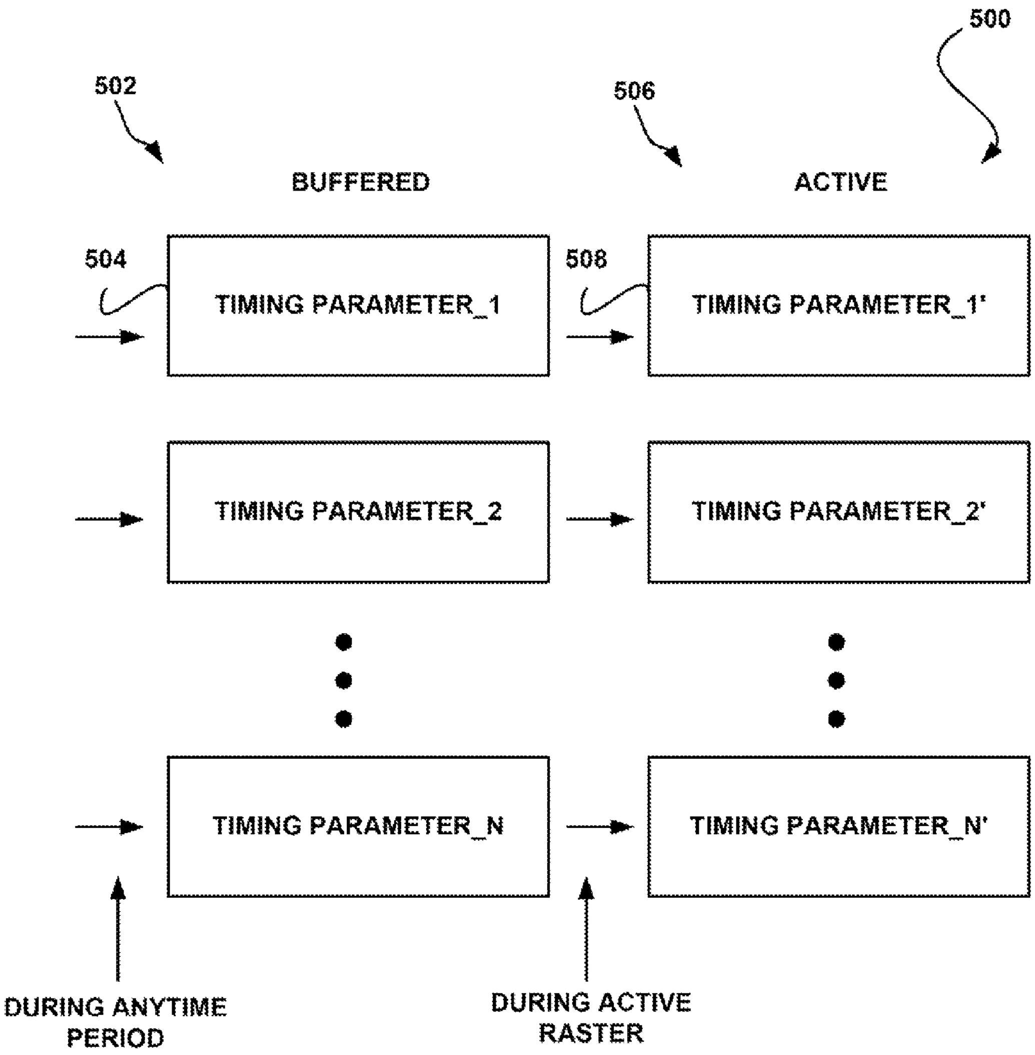
FIG. 5 shows a hardware system for reducing artifacts resulting from a change from a first refresh rate to a second refresh rate, in accordance with one embodiment.

FIG. 5 shows a hardware system 500 for reducing artifacts resulting from a change from a first refresh rate to a second refresh rate, in accordance with one embodiment. As an option, the present system 500 may be implemented in the context of the functionality and architecture of FIGS. 1-4. Just by way of example, any of the features set forth above may optionally be incorporated with the present embodiment. Of course, however, the system 500 may be carried out in any desired environment. For instance, the hardware present system 500 may constitute an alternative to a software solution. Again, the aforementioned definitions may apply during the present description.

As shown, a first register 502 is provided for storing at least one first refresh parameter 504 in association with a first refresh rate. Additionally, a second register 506 is provided for storing at least one second refresh parameter 508 in association with a second refresh rate. In the context of the present description, a register refers to any device used to store information.

Additionally, in the context of the present description, the refresh parameters may include any parameters associated with a refresh rate. For example, in one embodiment, the first refresh parameter and the second refresh parameter may each include a start line at which an inactive period begins. Additionally, the first refresh parameter and the second refresh parameter may each include an end line at which an inactive period ends. In this case, the inactive period refers to a period a time during a frame when a display is not being driven.

Furthermore, logic in communication with the first register and the second register is provided. In operation, the logic is utilized for selecting the first refresh parameter 504 or the second refresh parameter 508, for reducing artifacts resulting from a change from the first refresh rate and the second refresh rate. As an option, the selecting may be carried out utilizing a graphics processor. In this case, the graphics processor may remain in communication with memory (e.g. the first register 502 and the second register 506, etc.) and a display via a bus. In other embodiments, any desired device (e.g. a central processor, etc.) may be utilized to carry out the change from the first refresh rate to the second refresh rate.

Furthermore, the aforementioned logic may include any logic capable of selecting refresh parameters. In one embodiment, the selection of the first refresh parameter 504 or the second refresh parameter 508 may be performed in response to a request.

In one embodiment, it may be determined whether a display is operating in an active period. In this case, the selection of the first refresh parameter 504 or the second refresh parameter 508 may be made based on the determination. As an option, the determination of whether a display is operating in an active period may include identifying a current line count associated with the refresh of the display.

In this case, the determination of whether a display is operating in an active period may further include a comparison involving the current line count, and either a start line at which an inactive period begins or an end line at which the inactive period ends. As another option, the determination of whether a display is operating in an active period may include a comparison involving the current line count and a threshold. As still another option, the comparison may involve the threshold, and a difference between the current line count and a start line at which an inactive period begins.

It should be noted that by utilizing two registers in such a manner, the change in the refresh rate may be requested at any time during a display frame period. For example, the request to change from the first refresh rate to the second refresh rate may occur in an active period during which pixels are being written to a display device. In another example, the request to change from the first refresh rate to the second refresh rate may occur in an inactive period in which pixels are not being written to a display device.

As an option, it may be determined whether writing data to the first register will produce an artifact. In this case, if it is determined that writing data to the first register will produce an artifact, data may be written to the second register. For example, a request may be received to change a display refresh rate. In response to the request, the display refresh rate may be changed in such manner.

In particular, logic in communication with the first register and the second register may then be utilized for selecting the first refresh parameter or the second refresh parameter, for reducing artifacts. In this case, the selection may be based on the determination whether writing data to the first register will produce an artifact. Of course, such determination is an option and should not be construed as limiting in any manner.

Figure 6:
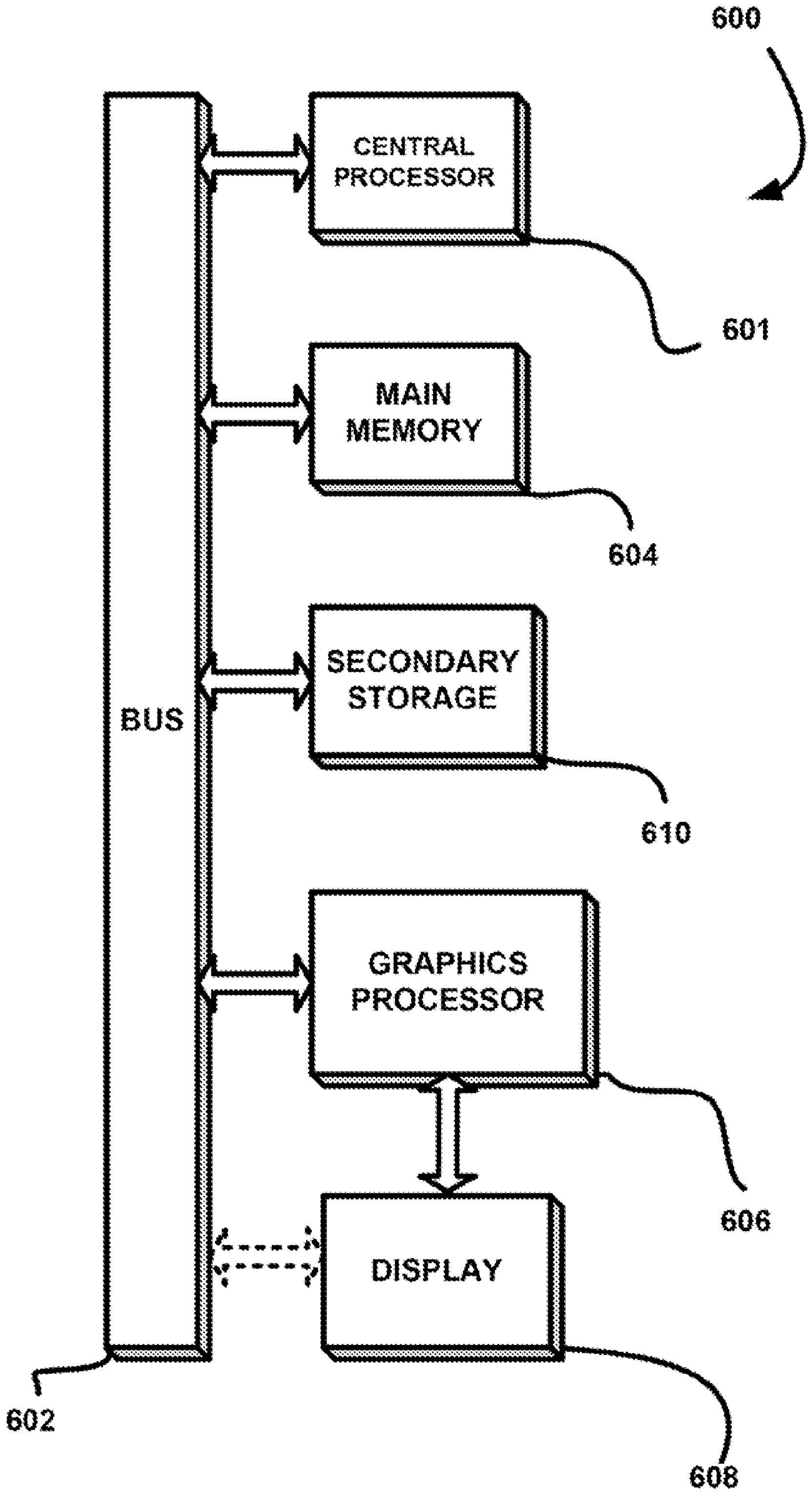
FIG. 6 illustrates an exemplary system in which the various architecture and for functionality of the various previous embodiments may be implemented.

FIG. 6 illustrates an exemplary system 600 in which the various architecture and/or functionality of the various previous embodiments may be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a GPU.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, lap-top computer, and or any other type of logic. Still yet, the system 600 may take the form of various other devices including, but not limited to, a personal digital assistant (PDA) device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:

a first register for storing at least one first refresh parameter in association with a first refresh rate;

a second register for storing at least one second refresh parameter in association with a second refresh rate; and logic in communication with the first register and the second register, the logic for selecting the first refresh parameter stored in the first register or the second refresh parameter stored in the second register, for reducing artifacts resulting from a change from the first refresh rate and the second refresh rate;

wherein the system is operable such that a request to change from the first refresh rate to the second refresh rate occurs in an active period during which pixels are being written to a display device, for allowing time for an update to propagate to timing registers and subsequently propagate to the display device before a next vertical blanking period for reducing the artifacts resulting from the change from the first refresh rate and the second refresh rate;

wherein the system is operable such that the change from the first refresh rate to the second refresh rate occurs in the active period in which the request to change occurred and before the next vertical blanking period.

2. The system of claim 1, wherein the selection is performed in response to a request.

3. The system of claim 2, wherein the request is received from an application.

4. The system of claim 2, wherein the request is received from a user.

5. The system of claim 1, and further comprising determining whether the display device is operating in the active period.

6. The system of claim 5, wherein the selection is made based on the determination.

7. The system of claim 5, wherein the determination includes identifying a current line count associated with the refresh of the display device.

8. The system of claim 7, wherein the determination further includes a comparison involving the current line count, and at least one of a start line at which an inactive period begins, and an end line at which the inactive period ends.

9. The system of claim 7, wherein the determination further includes a comparison involving the current line count and a threshold.

10. The system of claim 9, wherein the threshold is a function of at least one of a register read speed and a register write speed.

11. The system of claim 9, wherein the comparison involves the threshold, and a difference between the current line count and a start line at which an inactive period begins.

12. The system of claim 11, wherein the threshold is dependent on a timing of the display device.

13. The system of claim 1, wherein the selection is carried out utilizing a graphics processor.

14. The system of claim 13, wherein the graphics processor remains in communication with memory and the display device via a bus.

15. The system of claim 1, wherein the first refresh parameter and the second refresh parameter each include a start line at which an inactive period begins.

16. The system of claim 1, wherein the first refresh parameter and the second refresh parameter each include an end line at which an inactive period ends.

17. The system of claim 1, further comprising determining whether writing data to the first register will produce an artifact.

18. The system of claim 17, further comprising writing data to the second register if it is determined that writing data to the first register will produce an artifact.

19. The system of claim 1, wherein the system is operable such that the change from the first refresh rate to the second refresh rate occurs in the active period during which the pixels are being written to the display device and without interruption to the writing of the pixels to the display device.

20. A method, comprising:

storing at least one first refresh parameter in association with a first refresh rate, utilizing a first register;

storing at least one second refresh parameter in association with a second refresh rate, utilizing a second register; and selecting the first refresh parameter stored in the first register or the second refresh parameter stored in the second register, for reducing artifacts resulting from a change from the first refresh rate and the second refresh rate, utilizing logic in communication with the first register and the second register;

wherein a request to change from the first refresh rate to the second refresh rate occurs in an active period during which pixels are being written to a display device, for allowing time for an update to propagate to timing registers and subsequently propagate to the display device before a next vertical blanking period for reducing the artifacts resulting from the change from the first refresh rate and the second refresh rate;

wherein the change from the first refresh rate to the second refresh rate occurs in the active period in which the request to change occurred and before the next vertical blanking period.

* * * * *